(No Model.)

A. M. MURRAY.
FARM GATE.

No. 503,289. Patented Aug. 15, 1893.

Witnesses:
J. Halpenny
Geo. N. Stone.

Inventor:
Alexander M Murray
By Gridley & Hopkins
his Attorneys.

UNITED STATES PATENT OFFICE.

ALEXANDER M. MURRAY, OF CHICAGO, ILLINOIS.

FARM-GATE.

SPECIFICATION forming part of Letters Patent No. 503,289, dated August 15, 1893.

Application filed October 30, 1891. Serial No. 410,338. (No model.)

*To all whom it may concern:*

Be it known that I, ALEXANDER M. MURRAY, a citizen of Canada, residing at Chicago, in the county of Cook and State of Illinois, have invented certain new and useful Improvements in Farm-Gates, of which the following is a specification.

The object of the present invention is to provide a gate of such construction that it can be raised and lowered so as to regulate the distance between its bottom bar and the ground. The necessity for so raising the gate may be occasioned by snow banked up so high as to prevent or materially interfere with opening it. Another occasion for it is when it is desired to permit small animals to pass under while preventing larger ones from doing so. Still another occasion for it is when the outer end of the gate has sagged down, as nearly all large gates do in course of time, often to such an extent that they drag upon the ground. This sagging, whether it is due to the leaning of the post or to the springing of the gate, can be completely overcome by properly adjusting the parts, if the gate is constructed according to my invention.

The invention consists in certain features of novelty that are particularly pointed out in the claim hereinafter, and in order that it may be fully understood, I will describe it fully with reference to the accompanying drawings, which are made a part of this specification and in which—

Figure 1:
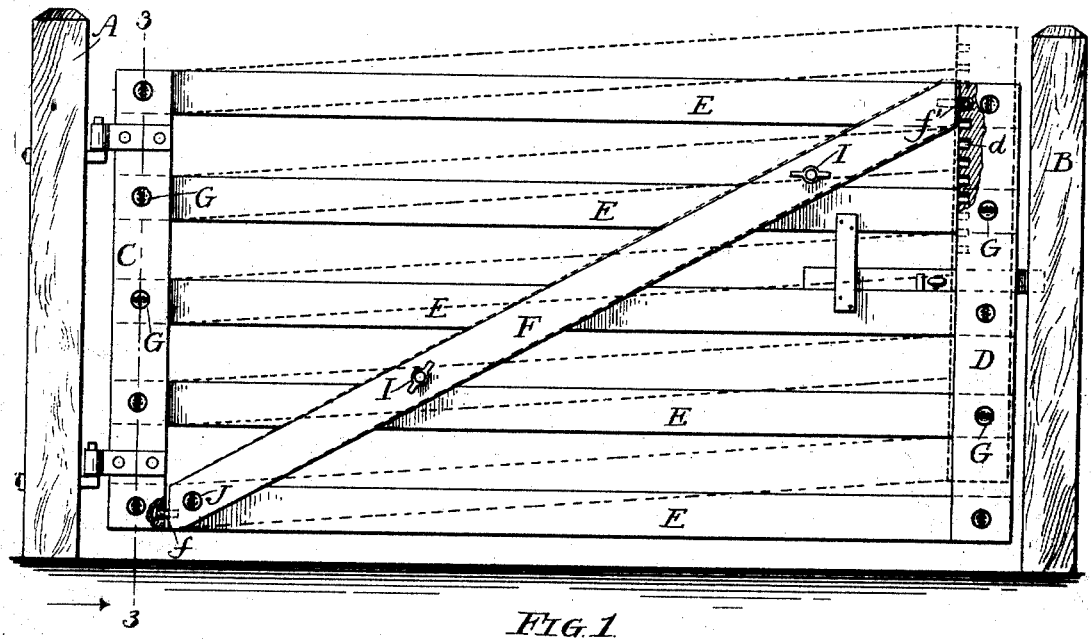
Figure 2:
Figure 3:
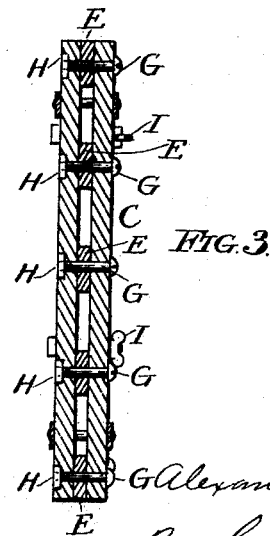

Figure 1 is an elevation of a gate embodying the invention. Fig. 2 is a plan view thereof. Fig. 3 is a vertical section on the line 3—3, Fig. 1.

A represents the post to which the gate is hinged and B the post to which its outer end is latched, when closed. The gate is constructed of a pair of uprights C and D, any desired number of bars E, and a diagonal brace F, all of which are constructed and secured together as presently described. Each of the uprights is constructed of two pieces of timber of the requisite dimensions between which the ends of the bars E project. A single round perforation is formed through each end of each bar and the uprights are correspondingly perforated for the passage of bolts G on which are turned nuts H, whereby the parts C, D, E are held together. The nuts H are countersunk in the uprights and are turned onto the bolts far enough to hold the parts securely together but not far enough to prevent such a relative parallel movement of the parts as would bring them to the positions shown by dotted lines in Fig. 1.

The brace F extends from the lower end of the inner upright C to the upper end of the outer upright D and consists of two pieces of timber of the requisite dimensions placed against opposite sides of the bars E and clamped thereto with the requisite force by clamp-screws I. The lower end of the brace is fulcrumed by a bolt J to the lower bar of the gate and has at its extremity a spur or tongue *f* which fits loosely in an opening in the upright C, the upper end of said brace being provided with means for engaging the upright D at any desired height. In the drawings I have shown for this purpose a spur *f'* adapted to enter any one of a vertical series of holes *d* formed in the upright, but any other means may be substituted for this. For example, a series of shoulders may be formed on the upright and the end of the brace so shaped as to engage them.

With a gate thus constructed, when it is desired to elevate the bottom bar the clamp-screws I are first loosened; then the outer upright D is lifted the desired height, say to the position indicated by dotted lines in Fig. 1. While it is being thus raised the outer end of the brace F will drag successively over the series of rests and will engage the last one it comes to, preventing the parts from returning to their former positions. The clamp screws are then again tightened leaving the gate in the position indicated by dotted lines in Fig. 1. It will be seen that the whole weight of the outer end of the gate is supported by the brace F, through which the load is transmitted to the lower end of the inner upright C.

What I claim as new, and desire to secure by Letters Patent, is—

In a gate, the combination of a pair of uprights C and D, each consisting of two pieces of timber, bolts G and nuts H by which said timbers are held together, said nuts being countersunk, a number of bars E having their ends inserted between the timbers of the uprights and perforated for the passage of the bolts G, a diagonal brace F consisting of two pieces of timber placed against opposite sides of the bars E, clamp-screws I by which said timbers are held in place, the bolt J upon which said brace is pivoted at its lower end, the spur $f$ on the inner end of said brace, engaging the upright C, the spur $f'$ on the outer end of said brace, and the series of holes $d$ formed in the outer upright D and adapted to be engaged by the spur $f'$, substantially as set forth.

ALEXANDER M. MURRAY.

Witnesses:
J. HALPENNY,
L. M. HOPKINS.